United States Patent
Oka (10) Patent No.: US 6,246,418 B1
(45) Date of Patent: Jun. 12, 2001

(54) DATA PROCESSING METHOD AND APPARATUS

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 08/853,704

(22) Filed: May 9, 1997

(30) Foreign Application Priority Data

May 10, 1996 (JP) .................................................. 8-116300

(51) Int. Cl.[7] .................................................. G06T 15/00
(52) U.S. Cl. .................................................. 345/441
(58) Field of Search .................................. 345/423, 434, 345/441, 429

(56) References Cited

U.S. PATENT DOCUMENTS

| | | | | |
|---|---|---|---|---|
| 4,811,245 | * | 3/1989 | Bunker et al. .................. | 345/429 |
| 4,825,391 | * | 4/1989 | Merz .............................. | 345/431 |
| 5,060,169 | * | 10/1991 | Khosla ............................ | 345/429 |
| 5,367,615 | * | 11/1994 | Economy et al. .............. | 345/423 |
| 5,767,860 | * | 6/1998 | Zimmer et al. ................. | 345/441 |
| 5,864,344 | * | 1/1999 | Ikedo .............................. | 345/426 |

FOREIGN PATENT DOCUMENTS

| | | | | |
|---|---|---|---|---|
| 2-2777-224A | | 10/1994 | (GB) ............................. | G06F/15/62 |
| 5096812 | * | 4/1993 | (JP) . | |
| 5219355 | * | 8/1993 | (JP) ............................. | G06F/3/153 |

OTHER PUBLICATIONS

Geymayer, B., et al., *Animation of Landscapes Using Satellite Imagery*, Eurographics, Vienna, Sep. 2–6, 1991, No. Conf. 12, Sep. 2, 1991 Post and Barth.

Harold S. Stone, ("Microcomputer Interfacing": Addison–Wesley Publishing Company, ISBN:0–201–07403–6, 1938.*

"3D Studio Max User's Guide", vol. 1, Concepts and Modeling, Kinetix, pp. 12–11 through 12–17, Mar. 1996.*

3D Studio Max Tutorials, Autodesk, Inc., Chapter 6, Mar. 1996.*

Clayton et al., "3D Studio Max Applied", Advanstar Communications, ISBN 0–929870–40–9, pp. 29–35, 375–379, 1996.*

Emanouilidis, "Creating computer games: fun and learning combined—Woried about an 'arcade mentality' toward computers? try having students write their own recreational software", The Computing Teacher, Mar. 1993.*

Sarabandi et al., "Numerical Simulation of Scattering from One–Dimensional Inhomogeneous Dielectric Random Surfaces", NTIS, Mar. 1996.*

Janke, "Recursive images—Using simple recursion and iterated functions systems to draw natural objects", Dr. Dobb's Journal, Jul. 1991.*

* cited by examiner

*Primary Examiner*—Mark Zimmerman
*Assistant Examiner*—Mano Padmanabhan
(74) *Attorney, Agent, or Firm*—Fulwider Patton Lee & Utecht, LLP (57) ABSTRACT

In a data processing system for improving processing speed, a main CPU transmits coordinates of a center point in a three-dimensional space over a main bus 101 to a programmable pre-processor which generates figure data for drawing plural unit figures (polygons) around the center point transmitted from the CPU and sends the figure data to a GPU. The GPU performs rendering processing in accordance with figure data supplied from the PPP for drawing a picture defined by the combination of the unit figures on a graphic memory.

22 Claims, 9 Drawing Sheets

DATA PROCESSING METHOD AND APPARATUS

This application claims priority under the International Convention based upon Japanese Patent Application No. P08-116300 filed May 10, 1996.

BACKGROUND OF THE INVENTION

1. Field of the Invention

This invention relates generally to a data processing method and apparatus in which figure data for drawing plural unit figures are generated from a sole figure data for improving the processing speed of the apparatus. More particularly, the invention relates to a data processing method and apparatus which may be employed with advantage in a graphics computer such as video equipment employing a computer, a special effect device (effector) or a video game machine, whereby enhanced data processing is achieved.

2. Description of the Related Art

It is common practice in the prior art to employ a video game machine wherein a main central processing unit (CPU) encloses a geometry transfer engine (GTE) which is a calculation processor for executing geometry processing such as coordinate transformation, perspective transformation, clipping or light source calculations. The main CPU defines a three-dimensional model as a combination of basic unit figures, such as triangles or quadrangles (three-dimensional model) for generating data for delineating a three-dimensional image.

When displaying, for example, a three-dimensional object, the main CPU resolves the object into plural unit figures and causes a GTE to perform geometry processing to generate figure data for drawing each unit figure. The main CPU is connected to a main bus and causes the figure data generated by the GTE to be transferred over the main bus 101 to a graphic processing unit (GPU).

On reception of the figure data from the main CPU, the GPU performs rendering processing of writing pixel-based picture data in a graphic memory from Z-values specifying the color data and the length of apex points of unit figures contained in the figure data (the information on the distance from the beginning point along the length), taking into account the color and the Z-values of all pixels making up the unit figure. The unit figure is drawn in this manner in the graphic memory. In addition, the CPU performs control for reading out the picture data written in the graphics memory to supply the picture data thus read out as video signals via a display controller, such as a CRT controller (CRTC) as video signal, for display on a display device, such as a television receiver, a cathode ray tube (CRT), liquid crystal or the like monitor. This permits the background of a video game, characters or the like to be displayed.

Meanwhile, the data of the unit figures, geometry-processed by the GTE under control by the CPU, are coordinates in the three-dimensional space of the apex points of the unit figure. Therefore, the data volume is irrelevant to the size of the unit figure. On the other hand, the drawing rate with which the unit figure is drawn on the pixel basis in the graphic memory is dependent on the size of the unit figure, that is the number of pixels making up the unit figure. Hence, if there are a large number of pixels making up the unit figure, drawing the unit figure is time-consuming, whereas, if the unit figure is made up of a smaller number of pixels, drawing the unit figure is not time-consuming.

Therefore, in continuously processing plural small-sized unit figures, it is a frequent occurrence that the figure data is not transferred in time from the main CPU over the main bus, despite the fact that the GPU has completed the rendering processing and is ready for performing the next processing. In other words, when a large number of small-sized unit figures are transferred from the main CPU to the GPU over the main bus, the transfer rate is limited by the main bus, with the result that it becomes difficult to improve the overall processing speed of the device.

Accordingly, there has been along existing need for enhanced data processing at increased processing speed. The present invention clearly fulfills these needs.

SUMMARY OF THE INVENTION

Briefly, and in general terms, the present invention provides improvements in data processing methods and apparatus whereby data processing speed can be substantially improved.

More particularly, by way of example and not necessarily by way of limitation, the present invention provides a picture information processing system including drawing means for effecting picture drawing in accordance with figure data configured for drawing a unit figure and for drawing a picture defined by a combination of said unit figures, output means for outputting a drawing command, and generating means for generating the figure data configured for drawing plural unit figures at random responsive to the drawing command transmitted from the output means over a bus for supplying the figure data thus generated to the drawing means.

In another aspect, the present invention provides a picture information processing method including the steps of supplying a drawing command over a bus, generating a plurality of figure data at random responsive to the supplied drawing command, and drawing a unit figure in accordance with the figure data.

With the above picture information processing method and apparatus, figure data transmitted by output means over a pre-set bus are received and figure data for drawing plural unit figures are generated from the sole figure data and sent to drawing means, thus allowing an increase in the overall processing speed of the entire system.

Hence, the present invention satisfies a long existing need for enhanced data processing at increased processing speed. The present invention clearly fulfills these needs.

These and other objects and advantages of the invention will become apparent from the following more detailed description, when taken in conjunction with the accompanying drawings of illustrative embodiments.

DESCRIPTION OF THE PREFERRED EMBODIMENTS

Referring now to the drawings, like reference numerals denote like or corresponding parts throughout the drawing figures.

Figure 1:
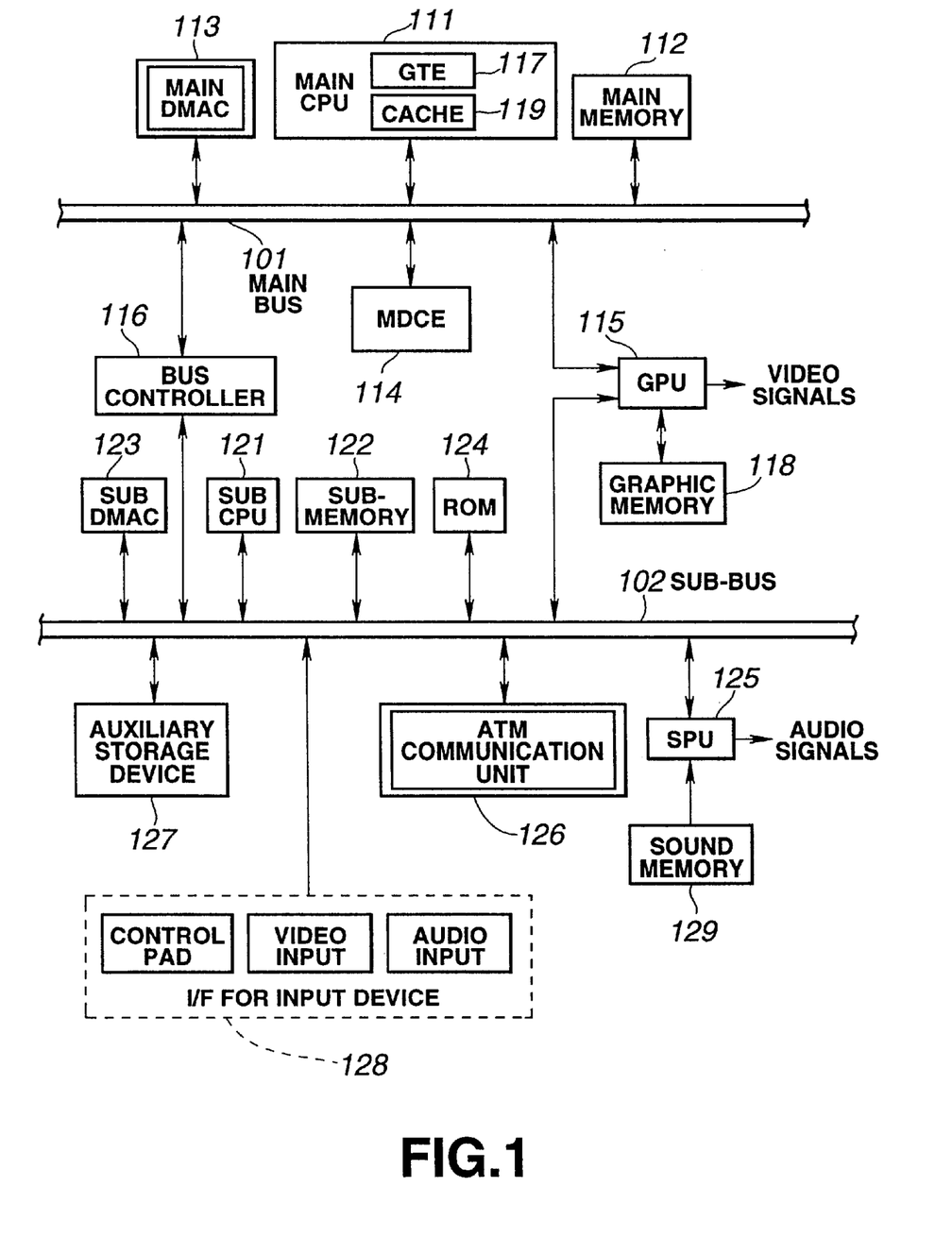
FIG. 1 is a block diagram illustrating a conventional video game machine.

A typical example of a prior art video game machine is shown in FIG. 1, wherein a main central processing unit (CPU) 111 encloses a geometry transfer engine (GTE) which is a calculation processor for executing geometry processing such as coordinate transformation, perspective transformation, clipping or light source calculations. The main CPU 111 defines a three-dimensional model as a combination of basic unit figures, such as triangles or quadrangles (three-dimensional model) for generating data for delineating a three-dimensional image.

When displaying, for example, a three-dimensional object, the main CPU 111 resolves the object into plural unit figures and causes a GTE 117 to perform geometry processing to generate figure data for drawing each unit figure. The main CPU 111 is connected to a main bus 101 and causes the figure data generated by the GTE 117 to be transferred over the main bus 101 to a graphic processing unit (GPU) 115.

On reception of the figure data from the main CPU 111, the GPU 115 performs rendering processing of writing pixel-based picture data in a graphic memory 118 from Z-values specifying the color data and the length of apex points of unit figures contained in the figure data (the information on the distance from the beginning point along the length), taking into account the color and the Z-values of all pixels making up the unit figure. The unit figure is drawn in this manner in the graphic memory. In addition, the CPU 111 performs control for reading out the picture data written in the graphics memory 118 to supply the picture data thus read out as video signals via a display controller, such as a CRT controller (CRTC) as video signal, for display on a display device, such as a television receiver, a cathode ray tube (CRT), liquid crystal or the like monitor. This permits the background of a video game, characters or the like to be displayed.

Meanwhile, the data of the unit figures, geometry-processed by the GTE 117 under control by the CPU 111, are coordinates in the three-dimensional space of the apex points of the unit figure. Therefore, the data volume is irrelevant to the size of the unit figure. On the other hand, the drawing rate with which the unit figure is drawn on the pixel basis in the graphic memory 118 is dependent on the size of the unit figure, that is the number of pixels making up the unit figure. Hence, if there are a large number of pixels making up the unit figure, drawing the unit figure is time-consuming, whereas, if the unit figure is made up of a smaller number of pixels, drawing the unit figure is not time-consuming.

Therefore, in continuously processing plural small-sized unit figures, it is a frequent occurrence that the figure data is not transferred in time from the main CPU 111 over the main bus 101, despite the fact that the GPU 115 has completed the rendering processing and is ready for performing the next processing. In other words, when the large number of small-sized unit figures are transferred from the main CPU 111 to the GPU 115 over the main bus 101, the transfer rate is limited by the main bus 101, with the result that it becomes difficult to improve the overall processing speed of the device.

Figure 2:
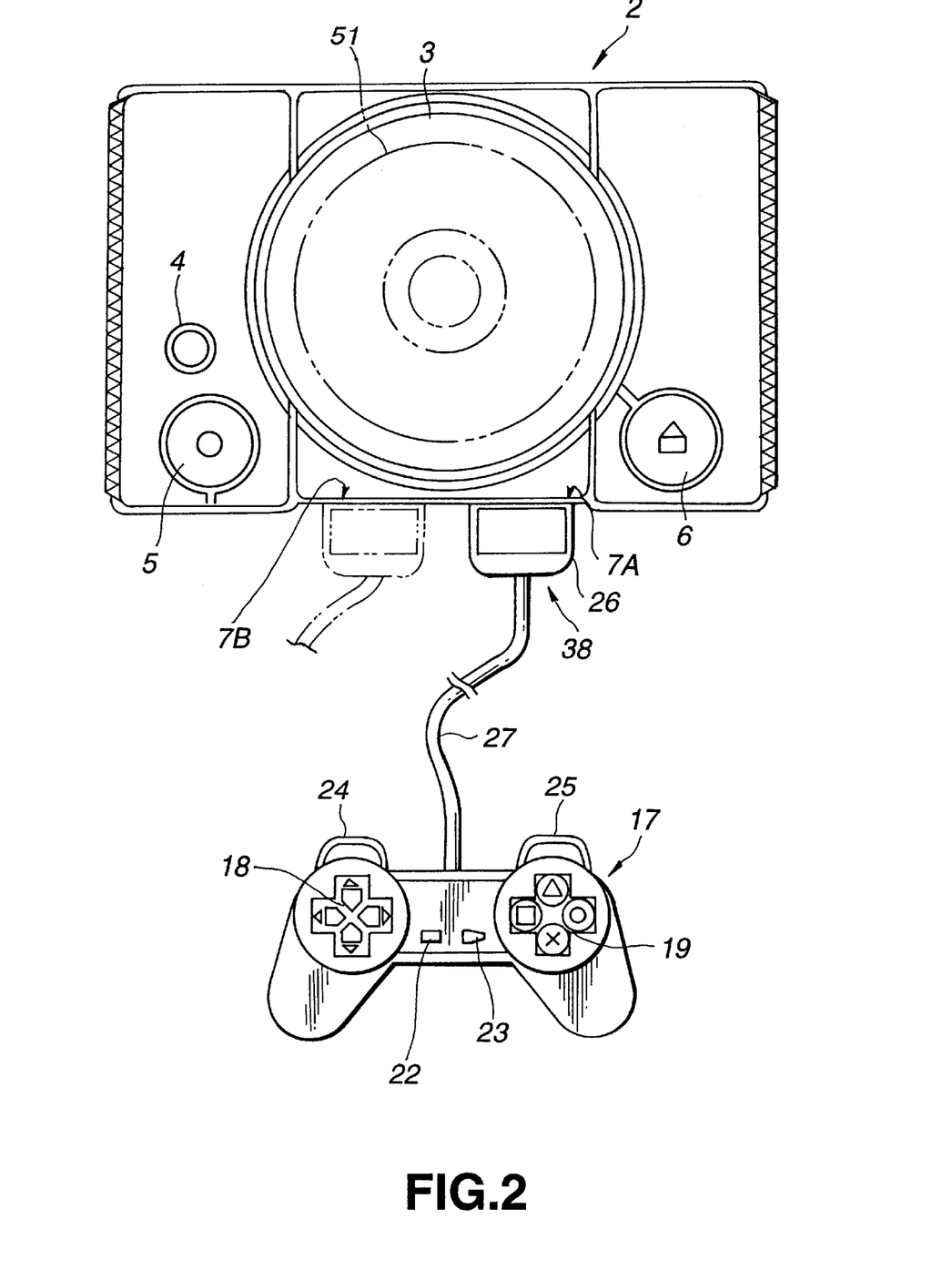
FIG. 2 is a plan view showing the structure of a video game machine embodying the present invention.
Figure 3:
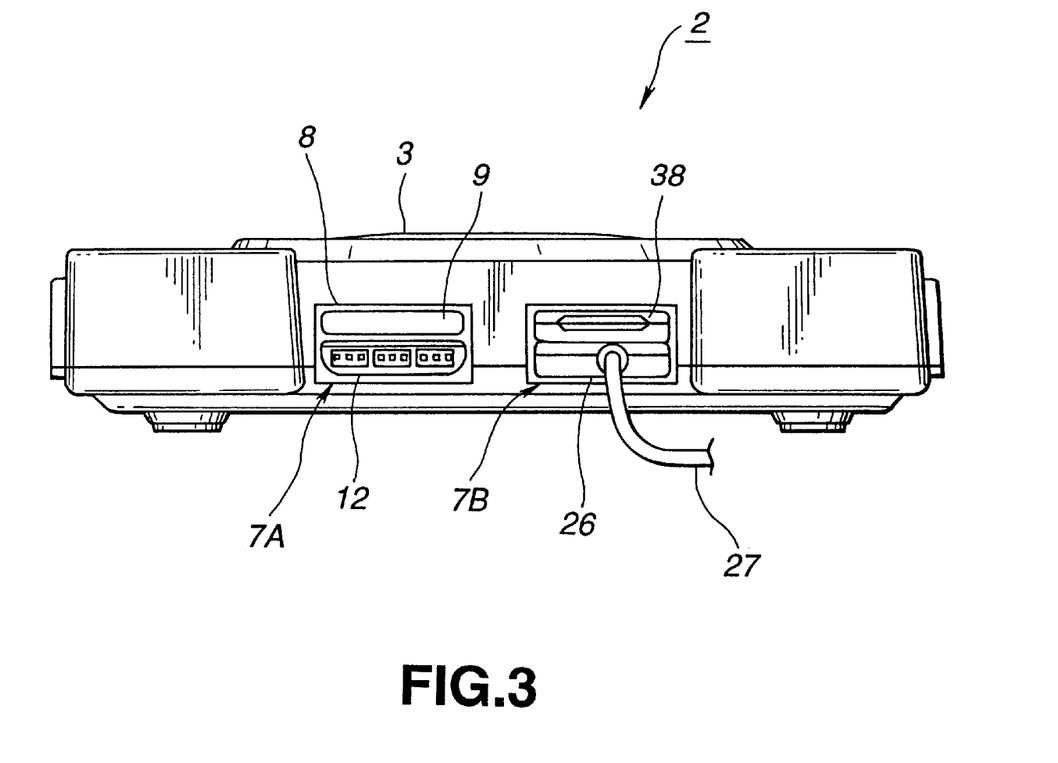
FIG. 3 is a front view of the video game machine of FIG. 2.
Figure 4:
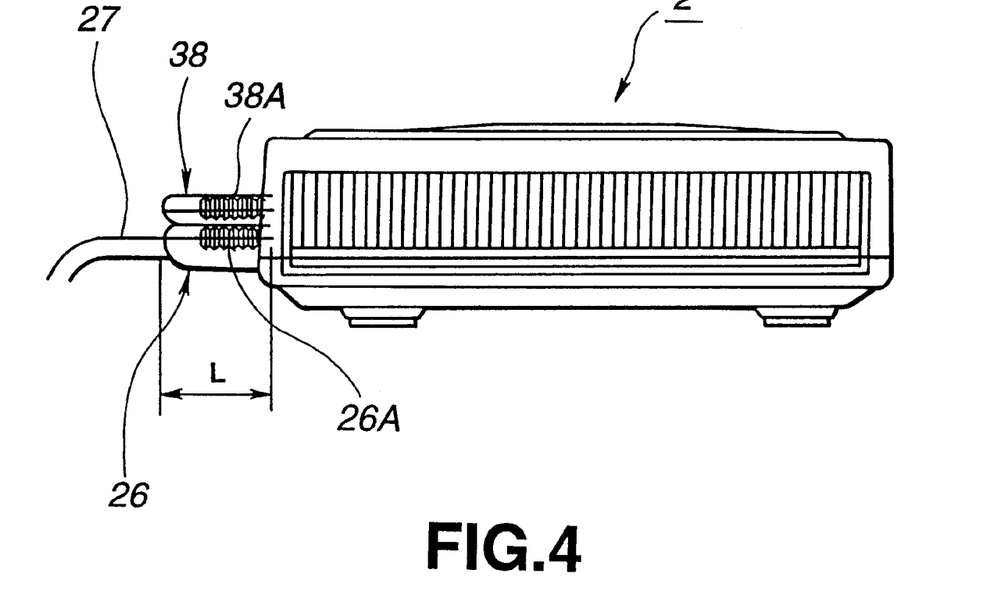
FIG. 4 is a side view of the video game machine of FIG. 2.

Referring now more particularly to FIGS. 2–4 of the drawings, a video game machine embodying the invention is made up of a main body portion of the machine 2, an actuating unit 17 having a substantially tetragonally-shaped connection terminal portion 26 connected to the main body portion of the machine 2 and a recording device 38 similarly connected to the main body portion of the machine 2.

Figure 5:
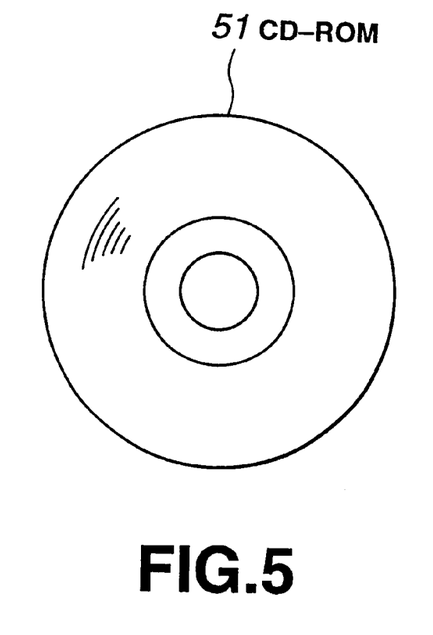
FIG. 5 is a plan view showing a CD-ROM.

The main body portion of the machine 2 is substantially tetragonally-shaped and is provided at a mid portion thereof with a disc loading unit 3 for loading thereon a recording medium for game having recorded thereon programs or data for playing the game. In the present embodiment, a CD (compact disc)-ROM 51 shown for example in FIG. 5 is detachably mounted on the disc loading unit 3. The recording medium for a game, however, is not limited to a disc.

On the left-hand side of the game loading unit 3 are mounted a reset switch 4, actuated when resetting the game and a power source switch 5 actuated when turning the power source on or off. On the right-hand side of the game loading unit 3 is mounted a disc actuating switch 6 actuated for opening/closing the disc loading unit 3. On the front side of the main body portion of the machine 2 are mounted connecting units 7A, 7B to which the actuating unit 17 and the recording device 38 can be connected as a set. Although the connecting units 7A, 7B are mounted for connecting the two sets of the actuating units 17 and the recording devices 38, it is possible to provide a number of the connecting units necessary for connecting more than two sets of the actuating units 17 and the recording devices 38.

The connecting units 7A, 7B are formed in two tiers, as shown in FIGS. 3 and 4. The upper tier includes a recording inserting unit 8 connected to the recording device 38, while the lower tier includes a connection terminal inserting unit 12 connected to the connection terminal 26 of the actuating unit 17.

The insertion opening of the recording inserting unit 8 is of a transversely elongated rectangular shape. The lower side corners of the inserting opening are rounded more prominently than the upper side corners thereof for preventing the recording device 38 from being inserted n the upside-down position. The recording inserting unit 8 is also provided with a shutter 9 for protecting connection terminals (not shown) for assuring internal electrical connection.

The shutter 9 is mounted in such a state in which it is perpetually biased towards outside under the force of a spring shaped as a torsion coil spring. Therefore, when inserting the recording device 38, the shutter 9 is opened towards the rear at a forward side of inserting the recording device 38. When the recording device 38 is pulled out, the shutter 9 is reset under the bias of the spring and automatically set to the closed state for protecting the internal connection terminal from dust and dirt and from external shock.

Referring again to FIGS. 3 and 4, the connection terminal inserting unit 12 has an inserting opening of a transversely elongated rectangular shape. The lower side corners of the inserting opening are rounded more prominently than the upper side corners thereof for preventing the connection terminal portion 26 of the actuating unit 17 from being inserted n the upside-down position. In addition, the inserting opening is different in profile from the inserting opening of the recording inserting unit 8 for preventing the recording device from being inserted therein. In this manner, the inserting openings for the recording device 38 and the actuating unit 17 are distinct in size and profile from each other for preventing mistaken insertion.

As shown in FIG. 2, the actuating unit 17 is configured so as to be held between palms of both hands so that five fingers of both hands are movable freely. The actuating unit 17 is made up of interconnected first and second rounded operating portions 18, 19, symmetrically shaped in the left-and-right direction, first and second square-shaped supporting portions 20, 21 protuberantly formed from the first and second rounded operating portions 18, 19, a selection switch 22 and a start switch 23, provided in mid constricted portions of the first and second rounded operating portions 18, 19, third and fourth operating portions 24, 25 protuberantly formed on the front sides of the first and second operating portions 18, 19 and a connection terminal portion 26 electrically connected to the main body portion of the machine 2 over a cable 27. The cable 27, however, may be omitted, if the overall structure is so configured.

The connecting terminal portion 26 is mounted on the distal end of the cable 27 adapted for being electrically connected to the main body portion of the machine 2. The connecting terminal portion 26 has a gripping portion 26A having its lateral surfaces roughed for slip-proofing effects, such as by knurling. The gripping portion of the connecting terminal portion 26 is formed as a so-called telescopic portion and has its size, that is the width W and the length L, equal to that of a grip 38A of the recording device 38, as later explained.

The recording device 38 has enclosed therein a non-volatile memory, such as a flash memory. The recording device 38 has the grip 38A (FIG. 4) configured similarly to the grip of the connection terminal 26 so that the recording device can be easily mounted on or dismounted from the main body portion of the machine 2. The recording device 38 is designed so that, when the game is discontinued temporarily, the prevailing state of the game is stored in the recording device. Thus, when re-starting the game, data is read out from the recording device 38 so that the game can be re-started from the state corresponding to the stored state, that is from the suspended state.

When the game is played by the above-described video game machine, the user connects the actuating unit 17 to the main body portion of the machine 2 and, if necessary, the recording device 38 is also connected to the main body portion of the machine 2. In addition, the user actuates the disc operating switch 6 for setting the CD-ROM 51 as the recording medium for game on the disc loading unit 3. The user also actuates the power source switch 5 for turning on the power source of the main body portion of the machine 2. Since the main body portion of the machine 2 now reproduces the picture and the speech for the game, the user actuates the actuating unit 17 to play the game.

Figure 6:
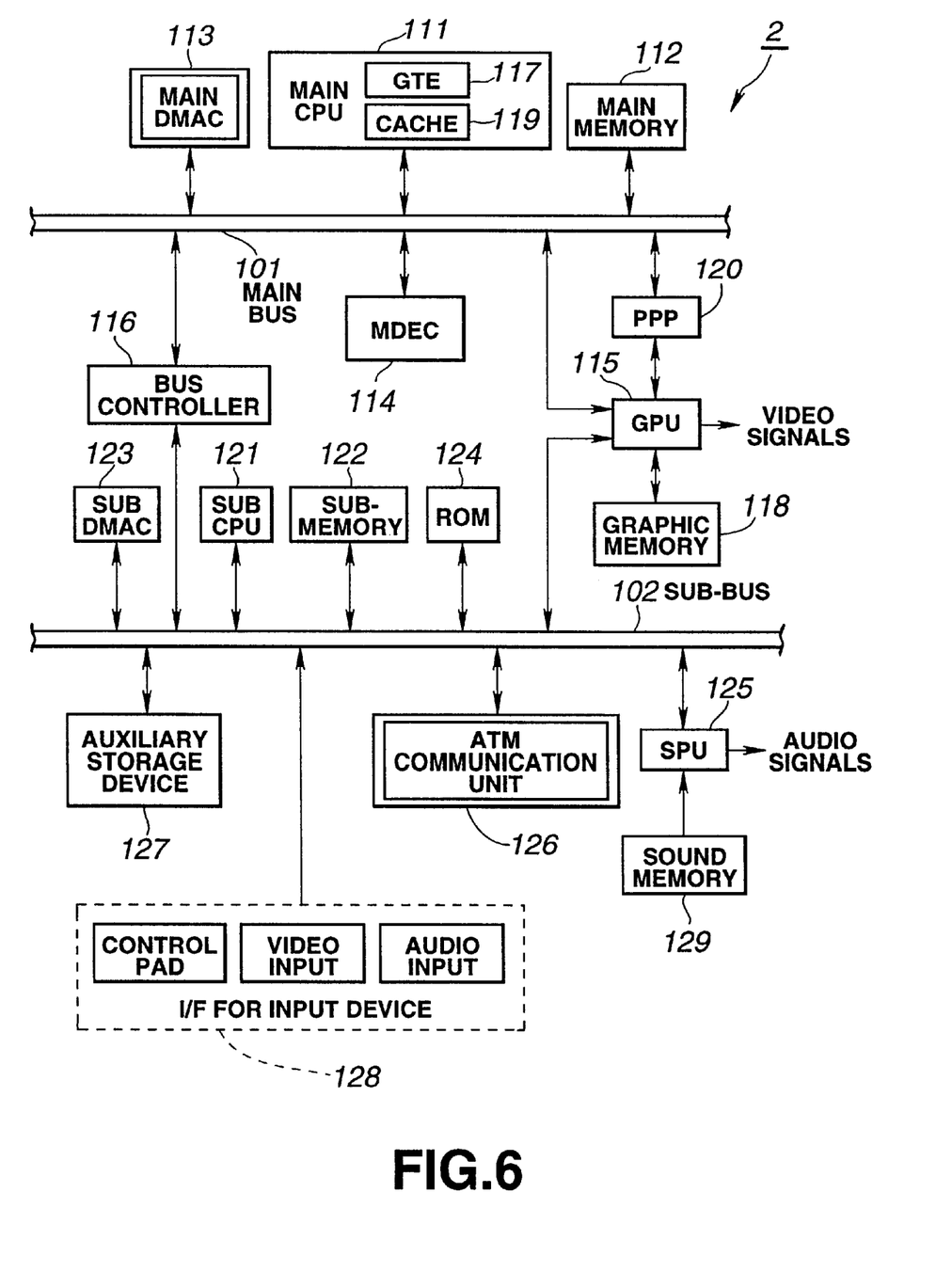
FIG. 6 is a system block diagram for a game machine incorporating the invention.

The overall electrical system shown in FIG. 6 shares many of the components and basic functions as those shown in FIG. 1 as depicted by the same numerals. That is, the present main body portion of the machine 2 is basically configured in the same way as the video game machine of FIG. 1 except that a programmable pre-processor (PPP) 120 is newly provided between a main bus 101 and the GPU 120, to facilitate practice of the present invention.

The main body portion of the machine 2 has two types of buses, that is a main bus 101 and a sub-bus 102, for exchanging data between respective subsystem blocks. The main bus 101 and the sub-bus 102 are interconnected by a bus controller 116.

To the main bus 101, there are connected, in addition to the bus controller 116, a main CPU 111 (output means), comprised of, for example, a microprocessor, a main memory 112, comprised of, for example, a random access memory (RAM), a main direct memory access controller (DMAC) 113, an MPEG (Moving Picture Experts Group) decoder (MDEC) 114, a GPU (drawing means)115 and a PPP (programmed pre-processor) as a generating means 120.

To the sub-bus 102, there are connected, in addition to the bus controller 116, the GPU 115, such as a CPU 121 configured similarly to the main CPU 111, a sub-memory 122, configured similarly to the main memory 121, a sub-DMAC 123, a read-only memory (ROM) 124 having stored therein an operating system or the like, a sound processing system (SPU) 125, an asynchronous transmission mode (ATM) communication unit 126, a subsidiary storage device 127 and an interface (I/F) for input device 128.

The main bus 101 is designed for high-speed data communication, while the sub-bus 102 is designed for low-speed data communication. That is, the sub-bus 102 is used for data that can be exchanged at a low speed for assuring high-speed operation on the main bus 101.

The main bus 101 can be disconnected from the sub-bus 102, while the sub-bus 102 can be connected to the main bus 102, under control by the bus controller 116. If the main bus 101 and the sub-bus 102 are disconnected from each other, only the devices connected to the main bus 101 can be accessed from the main bus 101, while only the devices connected to the sub-bus 102 can be accessed from the sub-bus 102. However, if the sub-bus 102 is connected to the main bus 101, any devices can be accessed from the main bus 101 or from the sub-bus 102. Meanwhile, in an initial state, such as immediately after turning on the power source of the system, the bus controller 112 is in the open state (that is, the main bus 101 remains connected to the sub-bus 102).

The main CPU 111 is designed for performing various processing operations in accordance with a program stored in the main memory 112. When the system is started, the main CPU 111 reads out a boot program via the bus controller 116 from the ROM 124 connected to the sub-bus 102 and executes the read-out program. This causes the main CPU 111 to load the application program, herein the boot program, and necessary data, in the main memory 112 or in the sub-memory 122 from the subsidiary storage device 127. The main CPU 111 thus executes the program loaded on the main memory 112.

The main CPU 111 has enclosed therein the GTE 117 as explained previously. This GTE 117 has a parallel operating subsystem, for executing plural processing operations in parallel, and executes geometry processing, such as coordinate transformation, light source calculations, matrix operations or vector operations, at a fast rate, responsive to requests from the main CPU 111. The GTE 117 thus performs processing corresponding to the requests from the main CPU 111 (geometry processing) for generating figure data of the unit figures to supply the figure data to the main CPU 111. On reception of the figure data from the GTE 117, the main CPU 111 generates a packet containing the figure data and transfers the packet over the main bus 101 to the GPU 115 or to the PPP 120.

Meanwhile, the main CPU 111 has enclosed therein a cache memory 119 and has access to this cache memory 119 instead of the main memory 112 for speeding up the processing.

The main DMAC 113 performs DMA transfer control on the devices connected to the main bus 101. If the bus controller 16 is in the open state, the main DMAC 113 also performs control on the devices connected to the sub-bus 102. The MDEC 114 is an I/O device capable of operating in parallel with the main CPU 111 and is configured for operating as a picture expanding engine. That is, the MDEC 114 s configured for decoding the encoded and compressed moving picture data.

The GPU 115 is configured for operating as a rendering processor. That is, the GPU 115 is configured for performing rendering processing of receiving a packet transmitted from the main CPU 111, main DMAC 113 or from the PPP 120 and writing picture data corresponding to the unit figure in the graphic memory 118 based on the Z-values arrayed as figure data in the packet for specifying color data and the length of the apex points of the unit figure. The GPU 115 is also configured for reading out picture data written in the graphic memory 118 for outputting the picture data thus read out as video signals. The GPU 115 is also configured for receiving packets from the devices connected to the sub-bus 102 if need be for performing rendering in accordance with figure data arrayed in the packets.

The graphic memory 118 is comprised of, for example, a DRAM for temporarily storing picture data supplied from the GPU 115. The graphic memory has such properties that it can be accessed on the page basis at a fast rate but it can be accessed across the pages only at an extremely retarded rate. Meanwhile, the graphic memory 118 has an area sufficient to store picture data for two frames so that picture data can be read out from one of the areas whilst picture data is being written in the other area.

The PPP 120 receives a packet transmitted from the main CPU 111 or from the main DMAC 113 and generates figure data for drawing plural unit figures from the sole figure data arrayed in the packet to packetize the figure data and to supply the resulting packet to the GPU 115.

The sub-CPU 121 reads out and executes the program stored in the sub-memory 122 in order to perform various processing operations. Similarly to the main memory 112, the sub-memory 122 is designed for storing programs or necessary data. The sub-DMAC 123 is designed for controlling DMA transfer for the devices connected to the sub-bus 102. The sub-DMAC 123 is designed to acquire bus rights only when the bus controller 116 is in the closed state, that is when the main bus 101 is disconnected from the sub-bus 102. The ROM 124 holds on memory the boot program and the operating system as explained previously. Meanwhile, the ROM 124 holds on memory both the program for the main CPU 111 and the program for the sub-CPU 121. The ROM 124 is of slow accessing speed and, hence, is connected to the sub-bus 102.

The SPU 125 is configured for receiving a packet transmitted from the sub-CPU 121 or the sub-DMAC 123 for reading out the speech data from the sound memory 129 in accordance with the sound command arrayed in the packet. The SPU 15 is configured for supplying and outputting the read-out speech data to a speaker, not shown. The ATM communication unit 126 is configured for controlling the communication over a public network, not shown (ATM communication). This enables the user of the video game machine to play the video game with a user of another video game machine directly or by having data exchanged with the user of the other video game machine via a pre-set center station.

The subsidiary storage device 127 is configured for reproducing the information (programs and data) stored in the CD-ROM 51 (FIGS. 2 and 5) in, for example, a disc drive. The subsidiary storage device 127 is also configured for recording or reading out data for the recording device 38 (FIG. 2). The I/F for input device 128 is an interface for accepting an input from outside, such as a signal corresponding to actuation of the actuating unit 17 as a control pad (FIG. 2) or a picture or speech reproduced by another device, and is configured for outputting a signal corresponding to the input from outside over the sub-bus 102. The sound memory 129 holds the speech data in memory.

In the above-described main body portion of the game machine 102, the boot program is read out from the ROM 124 in the main CPU 111 and executed on power up of the system for reading out the program and data from the CD-ROM 51 set in the subsidiary storage device 112 so as to be developed in the main memory 101 and the sub-memory 122. The program developed on the main memory 101 and the sub-memory 122 is executed in the main CPU 111 or in the sub-CPU 121 for reproducing the picture and the speech of the game.

In the main CPU 111, unit figure data for drawing a unit figure constituting a three-dimensional picture is generated in accordance with data stored in the main memory 112. These unit figure data are packetized and sent over the main bus 101 to the GPU 115 or to the PPP 120.

Figure 7:
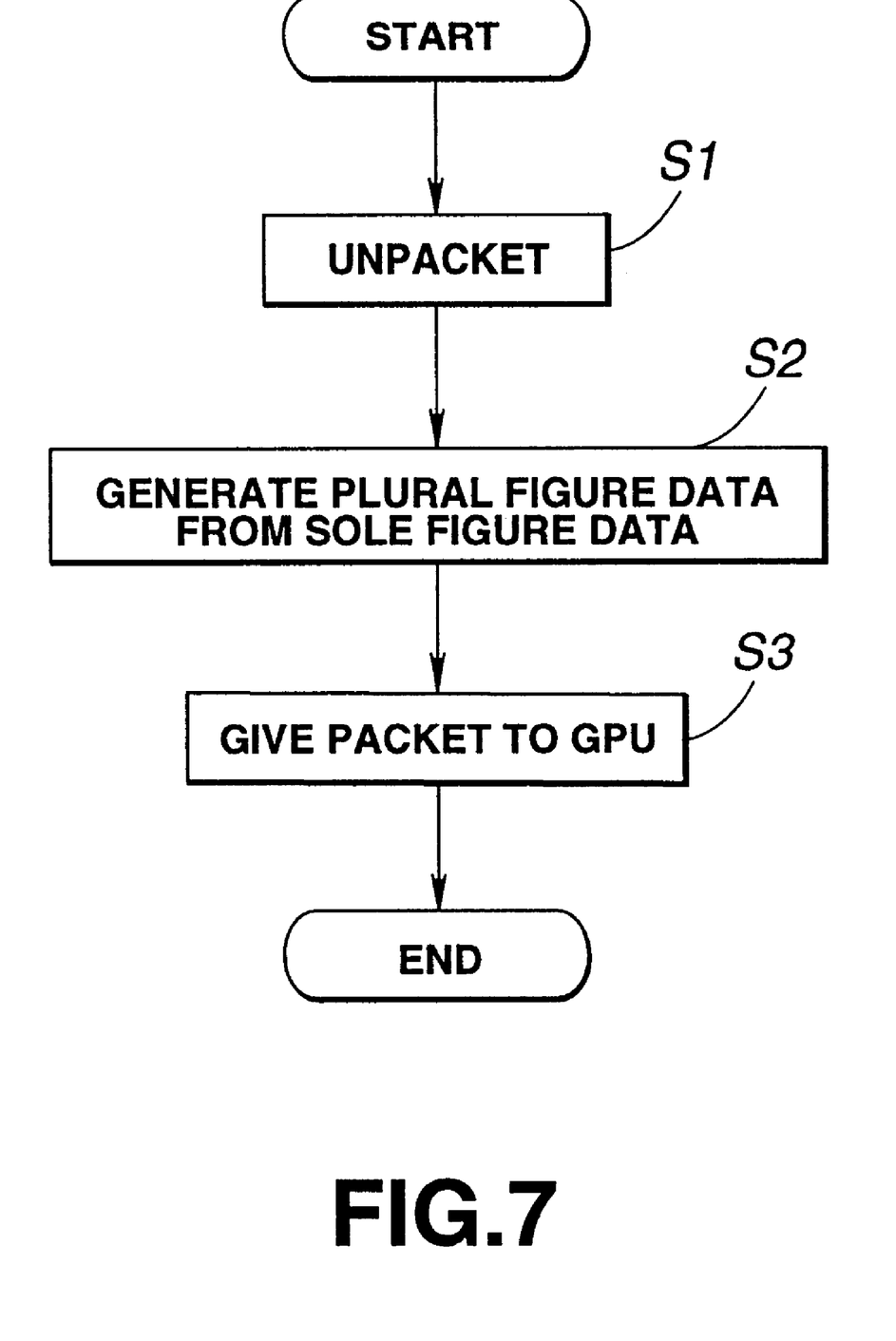
FIG. 7 is a flowchart for illustrating the processing of a programmed pre-processor (PPP) as shown in FIG. 6.

On reception of a packet from the main CPU 111, the PPP 120 first unpacketizes the packet at step S1 in the flowchart of FIG. 7 for taking out the figure data corresponding to a unit figure arrayed therein. The PPP 120 further generates at step S2 figure data corresponding to plural unit figures from the sole figure data to perform coordinate transformation or perspective transformation on the generated figure data if need be. The PPP 120 packetizes the plural figure data thus obtained and, at step S3, sends the packet to the GPU 115.

The GPU 115 receives the packet from the main CPU 111 or PPP 120 and performs rendering processing in accordance with figure data arrayed in the packet for writing the picture data in the graphic memory 118. The CPU 115 reads out previously written picture data from the graphic memory 118 and outputs the picture data as video signals. This displays a picture of the game.

On the other hand, the sub-CPU 121 generates a sound command for instructing speech generation in accordance with data stored in the sub-memory 122. This sound command is packetized and sent over sub-bus 102 to the SPU 125. The SPU 125 reads out and outputs speech data from the sound memory 129 in accordance with the sound command from the sub-CPU 121. This outputs the background music (BM) or the other speech for the game.

Figure 8A:
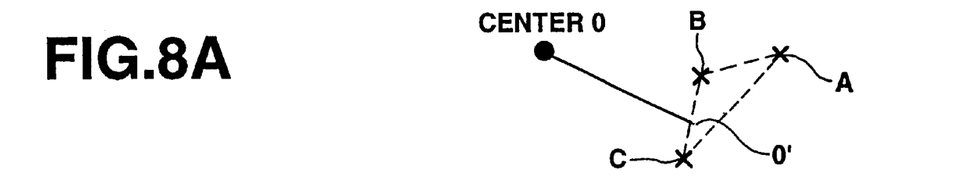
FIGS. 8A and 8B illustrate a unit figure generated by random numbers.

Referring to FIGS. 8A, 8B to 11, processing by the PPP 120 is further explained. The main CPU 111 is configured for transmitting a packet over the main bus 101 to the PPP 120. The packet includes the coordinates of a pre-set center point O (x0, y0, z0) in a three-dimensional space as a figure data and a command for instructing to draw plural triangles around the center point O. On reception of the packet, the PPP 120 generates a point O' at a point spaced a random distance from the center point O in a random direction, as shown in FIG. 8A. This point O' proves to be the center of the unit figure which herein is a triangle. That is, the PPP 120 generates three random numbers ox, oy and oz, and the point O' is a point represented by a coordinate (x0+ox, y0+oy, z0+oz).

In addition, the PPP 120 generates three points A, B and C, as apex points of the unit figure, at points each spaced a random distance in a random direction from the point O', as shown in FIG. 8A. That is, the PPP 120 generates nine random numbers rx0, rx1, rx2, ry0, ry1, ry2, rz0, rz1, rz2. The points represented by the coordinates (X0+ox+rX0, y0+oy+ry0, z0+oz+rz0), (X0+ox+rx1, y0+oy+ry1, z0+oz+rz1), (X0+ox+rx2, y0+oy+ry2, z0+oz+rz2) as points A, B and C, respectively.

Figure 8B:
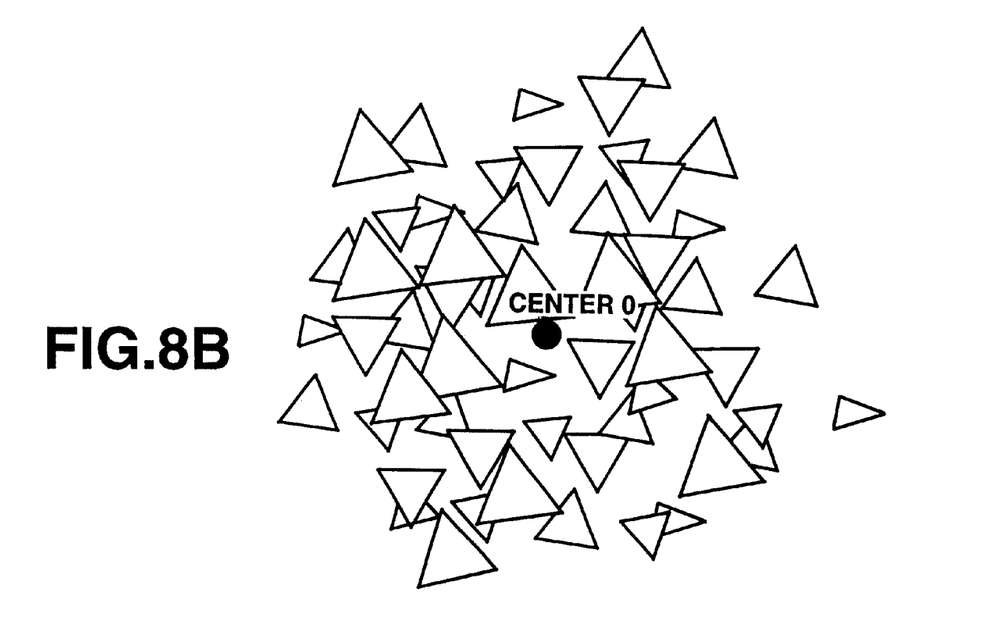

The PPP 120 repeats the above processing for generating figure data for drawing plural unit figures around the center point O, as shown in FIG. 8B.

If the coordinates in the three-dimensional space of three apex points A to C of a unit figure corresponding to the generated figure data are (X0, Y0, Z0) to (X2, Y2, Z2), the PPP 120 performs coordinate transformation of the coordinates in accordance with, for example, the following equations:

$$SXk=R11Xk+R12Yk+R13Zk+TRX$$
$$SYk=R21Xk+R22Yk+R23Zk+TRY$$
$$SZk=R31Xk+R32Yk+R33Zk+TRZ \quad (1)$$

where k=0, 1, 2. Rij denotes elements of a row i and a column j of a pre-set rotation matrix R and (TRX, TRY, TRZ) denotes translation vectors.

After finding the coordinates (SXk, SYk, SZk) on the three-dimensional space after coordinate transformation, the PPP 120 performs perspective transformation on the coordinates (SXk, SYk, SZk) in accordance with the following equations:

$$SSXk=SXk(h/SZk)$$
$$SSYk=SYk(h/SZk) \quad (2)$$

for transformation into coordinates (SSXk, SSYk) on a two-dimensional space.

The PPP 120 performs coordinate transformation or perspective transformation on all of the plural unit figures, herein triangles, drawn around the center point O, in accordance with the equations (1) or (2). The PPP 120 packetizes the resulting coordinates (SSXk, SSYk) on the two-dimensional space and routes the packet to the GPU 115. In this case, the GPU 115 performs rendering in accordance with the coordinates (SSXk, SSYk) on the two-dimensional space furnished from the PPP 120.

Heretofore, the above-described processing in the PPP 120 is performed in the CPU 111, so that figure data corresponding to a large number of small-sized figure units as shown in FIG. 8B are transferred over the main bus 101 to the GPU 115. The result is that the processing speed of the overall system is limited by the main bus 101. In a presently preferred embodiment of the invention, since only the figure data corresponding to the sole center point O is transmitted from the CPU 111 over the main bus 101, the figure data can be transmitted promptly (that is, the bandwidth can be reduced). In addition, since the GPU 115 performs rendering on the small-sized unit figure, the processing can be performed speedily leading to increased processing sped of the overall system.

In addition, the PPP 120 performs part of the processing so far performed by the CPU 111, thus relieving the load otherwise imposed on the CPU 111 promptly, thus improving the processing speed of the entire system. Since it is unnecessary for the main memory 112 to store all of the figure data corresponding to the large number of the unit figures as shown in FIG. 8B, the storage capacity of the main memory 112 can be reduced as compared to the case in which all of the figure data are stored.

The above-described technique of drawing a figure is particularly effective for representing the manner of an explosion of a unit figure.

In the above explanation, unit figures scattered about a point as center are drawn. It is however possible to draw unit figures scattered about a pre-set reference figure, such as a segment of a line, a triangle or a quadrangle. Also, in the above explanation, plural triangles are drawn about a center point. However, the unit figures drawn in this manner are not limited to triangles, but may also be points, straight lines (line segments) or quadrangles.

Figure 9:
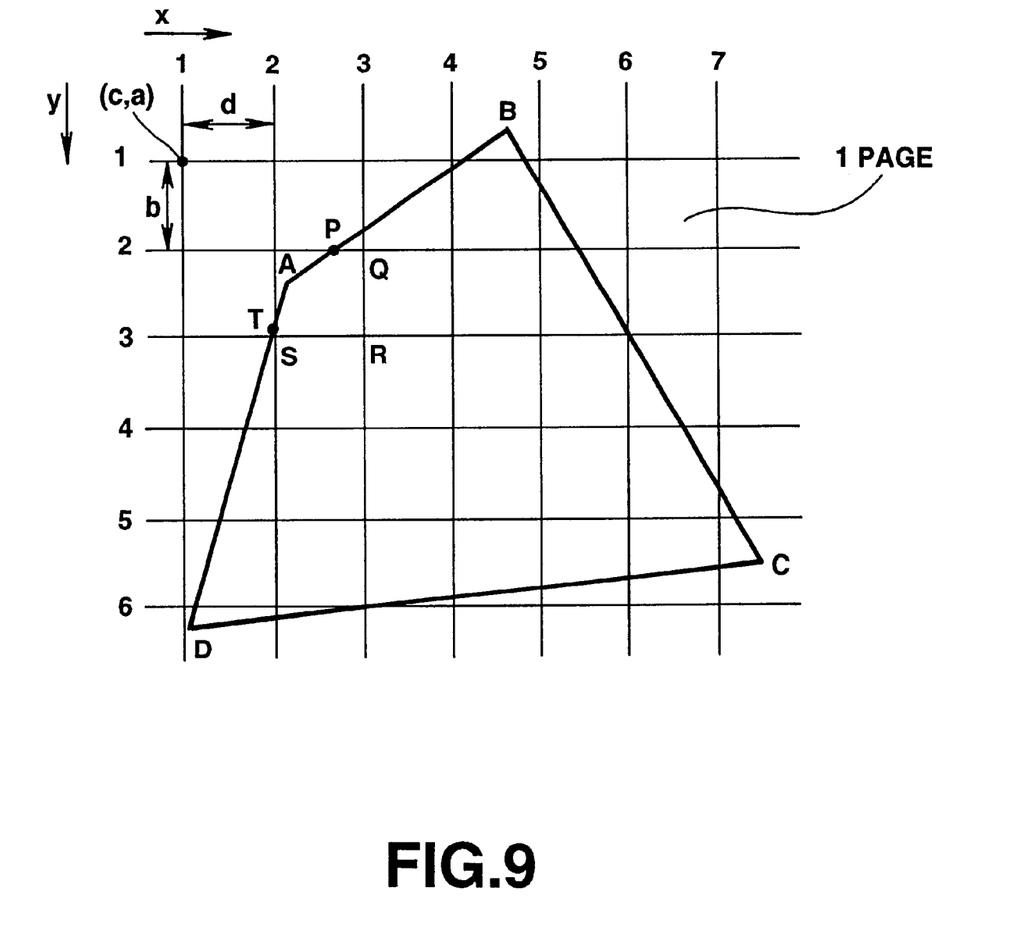
FIG. 9 shows a unit figure generated by dividing the unit figure in a two-dimensional space.

If picture data corresponding to a unit figure on the two-dimensional space, herein a quadrangle ABCD, as shown in FIG. 9, are written in a DRAM constituting the graphic memory 118 in the GPU 115, and the writing is done across a page boundary of the DRAM, accessing to the DRAM becomes time-consuming, thus obstructing the speedup of the processing.

Therefore, if, in drawing the quadrangle ABCD on the two-dimensional space as shown in FIG. 9, the areas defined by six horizontal line segments, numbered 1 to 6, extending parallel to the transverse direction of the screen (horizontal lines 1 to 6) and seven vertical line segments, numbered 1 to 7, extending parallel to the vertical direction of the screen (vertical lines 1 to 7), each corresponding to 1 page of the DRAM, the figure corresponding to picture data written in each page is desirably processed as a unit in view of expediting the processing.

The main CPJ 111 is configured for transmitting a packet inclusive of figure data comprised of plural unit figures on the three-dimensional space over the main bus 101 to the PPP 120. If the PP 120 should receive such a packet in which writing of picture data resulting from transformation into the unit figure on the two-dimensional space occurs across the page boundary of the DRAM, as shown in FIG. 9, the PPP 120 transforms the apex points in the three-dimensional space of the unit figure arranged as figure data n the packet by coordinate transformation or perspective transformation in accordance with the equations (1) or (2) The PPP 120 is configured for generating figure data corresponding to plural figure units obtained on dividing the quadrangle ABCD on the two-dimensional space (two-dimensional plane), shown in FIG. 9, in terms of an area corresponding to a 1 page of the DRAM as a unit.

If now the coordinates of four apex points A to D of the quadrangle ABCD on the two-dimensional space, obtained after perspective transformation, are denoted by (SSX0, SSY0) to (SSX3, SSY3), the horizontal lines 1 to 6 are denoted by equations y=a+bm, where m=0, 1, 2, 3, 4, 5 and the vertical lines 1 to 7 are denoted by equations x=c+dn, where n=0, 1, 2, 3, 4, 5, 6, the PPP 120 solves the simultaneous equations of the equations (3) and (4):

$$(SSX0-SSX1)(y-SSY0)=(SSY0-SSY1)(y-SSX0)$$
$$y=a+bm \quad (3)$$
$$(SSX0-SSX1)(y-SSY0)=(SSY0-SSY1)(y-SSX0)$$
$$x=c+dm \quad (4)$$

for various values of m or n to find points of intersection of the line segment AB with the horizontal lines 1 to 6 or the vertical lines 1 to 7.

The PPP 120 also formulates similar simultaneous equations for line segments BC, CD and DA to find points of intersection thereof with the horizontal lines 1 to 6 or the vertical lines 1 to 7. In the present case, the PPP 120 solves 42(=4(6+7)) simultaneous equations.

After finding the points of intersection of the line segments AB, BC, CD and DA with the horizontal lines 1 to 6 or the vertical lines 1 to 7, for example, points P or T in FIG.

9, the PPP 120 divides, in addition to these points of intersection, the quadrangle ABCD, in terms of a page of the DRAM as a unit, based on the points of intersections thus found and the points of intersection of the horizontal lines 1 to 6 with the vertical lines 1 to 7. This generates figure data corresponding to a large number of small-sized figure units.

Hence, the PPP 120 divides the quadrangle ABC into plural figure units sized to be within one page of the DRAM such as a hectangle APQRST shown in FIG. 9 and packetizes figure data corresponding to the figure unit to transmit the figure data corresponding to the figure unit to the GPE 115. In this case, the GPU 115 performs rendering processing based on a figure unit comprised within one DRAM page supplied from the PPP 120.

Heretofore, since the processing by the PPP 120 as described above is performed by the CPU 111, figure data corresponding to a large number of small-sized figure units as shown in FIG. 9 are transmitted over the main bus 101 to the GPU 115, if it is desired to increase the accessing speed to the graphic memory 118. Thus, the processing speed of the entire system is limited by the main bus 101. However, since the unit figure data transmitted from the CPU 111 over the main bus 101 is that corresponding to the sole large-sized quadrangle ABCD, unit figure data can be transmitted promptly. In addition, in the GPU 115, since the rendering processing for a small-sized unit figure is performed by the GPU 115, and the writing of the picture data corresponding to the sole unit figure is not performed beyond the DRAM page boundary, the processing can be expedited, thus increasing the processing speed of the entire system.

Since the PPP 120 shares the processing, so far performed by the man CPU 111, with the CPU 111, the load imposed on the CPU 111 can be correspondingly relieved.

Next, if, in displaying the unit figure on a screen, the unit figure is protruded out of the screen, the protruded portion tends to affect the display. This protruded portion needs to be screen-clipped.

The main CPU 111 is configured for transmitting a packet, inclusive of figure data on the three-dimensional space of the unit figure in need of screen clipping, over the main bus 101 to the PPP 120. On reception of such packet, the PPP 120 divides the unit figure corresponding to the figure data arrayed in the packet into several unit figures on the three-dimensional space. This generates figure data corresponding to plural unit figures.

Figure 10:
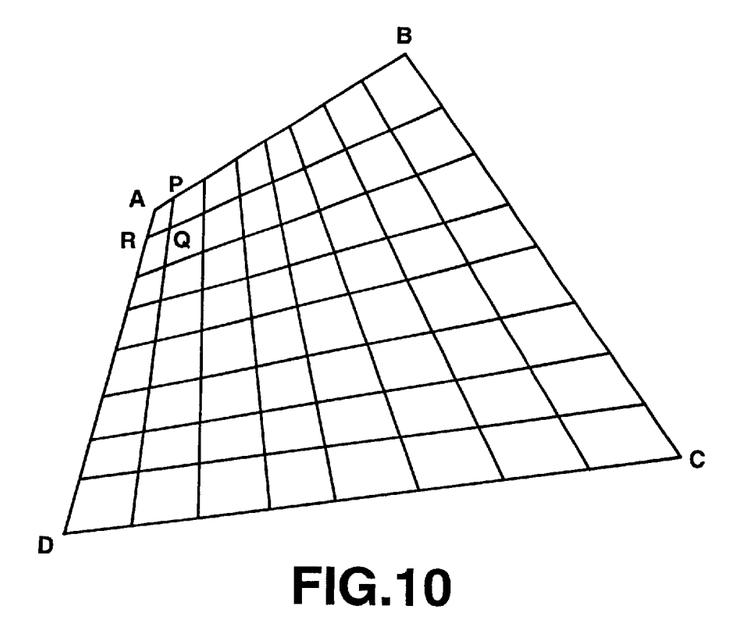
FIG. 10 shows a unit figure generated by dividing the unit figure in a three-dimensional space.
Figure 11:
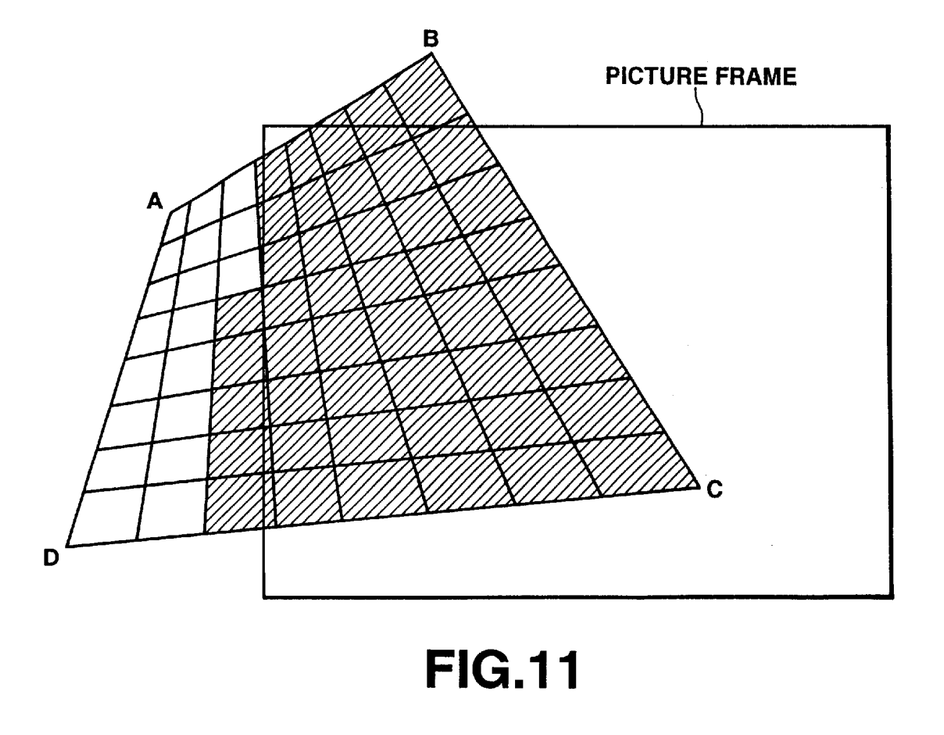
FIG. 11 illustrates a screen clip.

In this regard, on reception of coordinates (x0, y0, z0) to (x3, y3, z3) of apex points A, B, C and D on the three-dimensional space shown for example n FIG. 10 as figure data, the PPP 120 internally divides the coordinates of the apex points by 8×8 to generate 64 small-sized unit figures, such as quadrangles APQR, in accordance with the following equations:

$$Xij=((8-i)(8-j)x0+(8-i)jx1+i(8-j)x3+ijx2)/64$$

$$Yij=((8-i)(8-j)y0+(8-i)jy1+i(8-j)y3+ijy2)/64$$

$$Zij=((8-i)(8-j)z0+(8-i)jz1+i(8-j)z3+ijz2)/64 \quad (5)$$

where i and j are integers from 0 to 8.

The PPP 120 calculates coordinates $(Xij, Yij, Zij)$ of the apex points of these 64 unit figures.

The PPP 120 transforms the apex points $(Xij, Yij, Zij)$ in the three-dimensional space, thus found, by coordinate transformation or perspective transformation, in accordance with the equations (1) or (2) to generate plural small-sized unit figures on the two-dimensional space. These unit figures are obtained by 8×8 internal division of the quadrangle ABCD to form 64 unit figures followed by coordinate transformation and perspective transformation in this order. The PPP 120 then packetizes the coordinates (SSXij, SSYij) as figure data and transmits the resulting packet t the GPU 115. In this case, the GPU 115 performs rendering only on figure data corresponding to the 64 unit figures from the PPP 120 and containing portions displayed in the screen frame, as shown shaded in FIG. 11. This prevents wasteful picture drawing for picture portions not displayed on the screen.

Heretofore, since the processing by the PPP 120 is performed by the CPU 111, figure data corresponding to the large number of small-sized figure units shown in FIG. 10 are transmitted over the main bus 101 to the GPU 115. This leads to limitation of the processing speed of the entire device by the main bus 101. However, since the unit figure data transmitted from the CPU 111 over the main bus 101 corresponds to that of the sole large-sized quadrangle ABCD, the unit figure data can be transmitted promptly. Since the GPU 115 performs rendering on the small-sized unit figures, the processing can be expedited, thus leading to improved processing speed of the entire system.

Since the PPP 120 again shares the processing, usually performed by the main CPU 111, with the CPU 111, the load imposed on the CPU 111 can be correspondingly relieved.

Although the present invention has been explained with reference to the case of application to a video game machine, the present invention may also be applied to an effector for giving special effect to a picture, or a device for computer graphics processing, such as CAD.

Meanwhile, the method for generating plural unit figures is not limited to the method described above.

In the above-described embodiment, the packet is transferred from the main CPU 111 to the PPP 120. However, if the unit figure to be drawn need not be processed by the PPP 120, such as when the unit figures to be drawn are small-sized and few in number, the main CPU 111 directly transmits the packet corresponding to the unit figure to the GPU 115 without transmitting the packet to the PPP 120. In such case, pictures are drawn as conventionally.

Hence, the present invention satisfies a long existing need for enhanced data processing at increased processing speed.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A picture information processing system comprising:
   a first processor for generating a data packet including a drawing command and figure data having a first center point and for outputting the data packet on a bus which has a given data transferring speed;
   a second processor for receiving the data packet via the bus, for generating a plurality of second center points positioned relative to the first center point and for generating, for each of the plurality of second center points, figure data for a unit figure, the figure data including a plurality of apex points positioned relative to a corresponding one of the plurality of second center points; and
   a graphic processor for drawing each of the unit figures in accordance with the figure data,
   wherein the second processor supplies the generated figure data to the graphic processor directly and successively without using the bus.

2. The picture information processing system according to claim 1, wherein the first center point and each of the plurality of second center points have three-dimensional coordinate data.

3. The picture information processing system according to claim 1 wherein the second processor generates the plurality of second center points in order that each of the plurality of second center points is spaced a random distance in a random direction relative to the first center point.

4. The picture information processing system according to claim 1 wherein the second processor generates the plurality of apex points in order that each of the plurality of apex points is spaced a random distance in a random direction relative to the corresponding one of the plurality of second points.

5. The picture information processing system according to claim 1 wherein the first processor generates the data packet in order that the drawing command of the data packet instructs the second processor to generate a plurality of unit figures around the first center point.

6. A picture information processing method used in a system comprising a main processor for generating a packet including a drawing command and figure data for a first center point, a pre-processor connected to the main processor via a bus which has a given data transferring speed, and a graphic processor, the method comprising the steps of:

supplying the packet generated by the main processor to the pre-processor via the bus;

causing the pre-processor to generate a plurality of second center points positioned relative to the first center point of the packet according to the drawing command of the packet;

causing the pre-processor to generate, for each of the plurality of second center points, figure data for a unit figure, the figure data including a plurality of apex points positioned relative to a corresponding one of the plurality of second center points; and supplying the figure data generated by the pre-processor from the pre-processor to the graphic processor directly and successively without using the bus, so that the unit figures are drawn in a graphic memory.

7. The picture information processing method according to claim 6, wherein the first center point and each of the plurality of second center points have three-dimensional coordinate data.

8. The picture information processing method according to claim 6 wherein the plurality of second center points are generated by the pre-processor in order that each of the plurality of second center points is spaced a random distance in a random direction relative to the first center point.

9. The picture information processing method according to claim 6 wherein the figure data is generated by the pre-processor in order that each of the plurality of apex points is spaced a random distance in a random direction relative to the corresponding one of the plurality of second center points.

10. A picture information processing system comprising:
a bus having a given data transferring speed:
a main processor for generating figure data including a single three-dimensional coordinate point and a drawing command and for outputting the figure data and the drawing command on the bus;
a pre-processor for receiving the figure data and the drawing command via the bus, for generating a plurality of additional three-dimensional coordinate points positioned relative to the single three-dimensional coordinate point and for generating, for each of the plurality of additional three-dimensional coordinate points, figure data for a unit figure, the figure data including a plurality of apex points positioned relative to a corresponding one of the plurality of additional three-dimensional coordinate points; and
a graphic processor for drawing each of the unit figures in accordance with the figure data,
wherein the pre-processor supplies the generated figure data to the graphic processor directly and successively without using the bus.

11. The picture information processing system according to claim 10, wherein the pre-processor generates the plurality of additional three-dimensional coordinate points in order that the unit figures surround the single three-dimensional coordinate point.

12. The picture information processing system according to claim 10, wherein the pre-processor generates the plurality of additional three-dimensional coordinate points so that the plurality of additional three-dimensional coordinate points are at random positions around the single three-dimensional coordinate point and generates the figure data in order that the plurality of apex points are at random positions around their respective additional three-dimensional coordinate points.

13. A picture information processing method used in a system comprising a bus which has a given data transferring speed, a main processor for generating a single three-dimensional coordinate point and a drawing command, a pre-processor, and a graphic processor, the method comprising the steps of:

supplying the single three-dimensional coordinate point and the drawing command from the main processor to the pre-processor via the bus;

causing the pre-processor to generate a plurality of random three-dimensional coordinate points at random positions around the single three-dimensional coordinate point and a drawing command;

causing the pre-processor to generate, for each of the plurality of random three-dimensional coordinate points, figure data for a unit figure, the figure data including a plurality of apex points at random positions around corresponding one of the plurality of random three-dimensional coordinate points; and supplying the figure data from the pre-processor to the graphic processor directly and successively without using the bus so that the unit figures are drawn in a graphic memory by the graphic processor.

14. The picture information processing method according to claim 13, further comprising the step of:

causing the pre-processor, after the plurality of apex points are generated, to execute coordinate-transforming of the unit figures in multi-dimensional space.

15. The picture processing method according to claim 14, further comprising the step of: causing the pre-processor, after the coordinate-transforming is executed, to execute perspective transforming of the unit figures.

16. A picture processing system for processing an image having at least one non-random object and at least one random object, said system comprising:
a data bus;
a main processing unit for generating first figure data for the at least one non-random object and second figure data for the at least one random object, the second figure data including a sole center point and a drawing command, the main processing unit outputting the first figure data and the second figure data over the data bus;

a processing device for receiving said second figure data via the data bus and generating, based on the sole center point and the drawing command, a plurality of random center points at random positions around the sole center point, and generating, for each of the plurality of random center points, figure data for at least one random unit figure, the figure data including a plurality of apex points at random positions around a corresponding one of the plurality of random center points; and a drawing device for receiving the first figure data via the data bus and for receiving the random unit-figure data directly and successively from the processing device, the drawing device for drawing the non-random object in accordance with the first figure data and drawing each of the random unit figures in accordance with the random unit-figure data.

17. A method of processing an image having at least one non-random object and at least one random object, said method comprising the steps of:

generating first figure data for the at least one non-random object;

generating second figure data for the at least one random object, the second figure data including a sole center point and a drawing command;

transferring the first data to the drawing device via the bus, wherein the drawing device draws the non-random object in accordance with the first figure data;

transferring the second data to a processor via the bus, wherein the processor processes the second figure data by generating, based on the sole center point and the drawing command, a plurality of random center points at random positions around the sole center point, and generating, for each of the random center points, figure data for at least one random unit figure, the figure data including a plurality of apex points at random positions around the random center point; and transferring the random-unit figure data directly and successively to the drawing device without using the bus, wherein the drawing device draws each of the random unit figures in accordance with the random unit-figure data.

18. An image generating system comprising:

a bus having a given data transferring speed;

a graphic processor for drawing in a graphic memory to generate an image in accordance with a data item;

a main processor for generating a packet including a drawing command and figure data which identifies a desired figure, and for outputting the generated packet on the bus; and a pre-processor for receiving the packet from the main processor via the bus, for generating a plurality of data items according to the drawing command and the figure data of the received packet, and for supplying the generated data items to the graphic processor directly and successively without using the bus.

19. The system according to claim 18, wherein the main processor generates the packet which further includes a center point in a three-dimensional coordinate area;

the pre-processor executes a first process for generating a figure based on the desired figure, a second for positioning the generated figure in the three-dimensional coordinate area such that the generated figure is positioned a random distance in a random direction relative to the center point, and a third process for generating one data item including an instruction for the graphic processor to draw the generated and positioned figure into the graphic memory, and repeats the first to third processes by a predetermined number of times so that the plurality of data items are generated; and the graphic processor draws figures successively in accordance with the plurality of data items thereby generating the image composed of the figures which are positioned around the center point.

20. The system according to claim 18, wherein the graphic memory has page boundaries according to accessing by the graphic processor; and the pre-processor divides the desired figure which crosses at least one of the page boundaries, into a plurality of figures such that none of the plurality of figures cross any of the page boundaries, and generates the plurality of the data items instructing the graphic processor to draw the figures into the graphic memory respectively.

21. The system according to claim 18, wherein the desired figure has a size which exceeds a display size of a screen, the pre-processor divides the desired figure into a plurality of figures and generates the plurality of the data items instructing the graphic processor to draw the figures into the graphic memory respectively; and the graphic processor selects at least one figure from the figures generated by dividing the desired figure, each of the at least one figure having an overlap portion with the screen, and draws only the selected at least one figure into the graphic memory.

22. The system according to claim 18, wherein the graphic processor is connected with the bus;

the main processor determines whether or not the drawing command and figure data satisfy a predetermined condition; and when the drawing command and figure data satisfy the predetermined condition, the main processor generates the packet and outputs it to the graphic processor as the data item via the bus.

* * * * *

UNITED STATES PATENT AND TRADEMARK OFFICE
CERTIFICATE OF CORRECTION

PATENT NO.   : 6,246,418 B1
DATED        : June 12, 2001
INVENTOR(S)  : Masaaki Oka It is certified that error appears in the above-identified patent and that said Letters Patent is hereby corrected as shown below:

Column 5,
Line 61, change "GPU 120", to read -- GPU 115 --.

Column 8,
Line 38, change "CPU 115", to read -- GPU 115 --.

Column 10,
Line 26, change "CPJ 111", to read -- CPU 111 --.
Line 29, change "PP 120", to read -- PPP 120 --.

Signed and Sealed this

Fifteenth Day of January, 2002

Attest:

JAMES E. ROGAN
*Director of the United States Patent and Trademark Office*

*Attesting Officer*